(12) United States Patent
Miyazaki (10) Patent No.: US 8,466,862 B2
(45) Date of Patent: Jun. 18, 2013

(54) LIQUID CRYSTAL DISPLAY DEVICE

(75) Inventor: Kaori Miyazaki, Mobara (JP)

(73) Assignees: Hitachi Displays, Ltd., Chiba (JP);
Panasonic Liquid Crystal Display Co., Ltd., Hyogo (JP)

( * ) Notice: Subject to any disclaimer, the term of this patent is extended or adjusted under 35 U.S.C. 154(b) by 183 days.

(21) Appl. No.: 13/165,992

(22) Filed: Jun. 22, 2011

(65) Prior Publication Data

US 2011/0317105 A1 Dec. 29, 2011

(30) Foreign Application Priority Data

Jun. 25, 2010 (JP) ................................. 2010-145426

(51) Int. Cl.
*G09G 3/36* (2006.01)
(52) U.S. Cl.
USPC ................ 345/87; 345/88; 345/690; 349/106
(58) Field of Classification Search
USPC ............... 345/76, 77, 84, 87–89, 90, 92, 102, 345/204, 211, 690; 349/104, 106
See application file for complete search history.

(56) References Cited

U.S. PATENT DOCUMENTS

| | | | | |
|---|---|---|---|---|
| 6,211,853 B1 * | 4/2001 | Takeuchi et al. | ............... | 345/108 |
| 6,529,255 B1 | 3/2003 | Sekiguchi | | |
| 6,724,973 B1 * | 4/2004 | Takeuchi et al. | ............... | 385/147 |
| 7,605,891 B2 * | 10/2009 | Chang | ........................... | 349/114 |
| 7,920,231 B2 * | 4/2011 | Tanno et al. | ................... | 349/106 |
| 8,233,121 B2 * | 7/2012 | Tsai et al. | ...................... | 349/108 |
| 2001/0024178 A1 * | 9/2001 | Takeuchi et al. | ................. | 345/55 |
| 2002/0191947 A1 * | 12/2002 | Takeuchi et al. | ............... | 385/147 |
| 2006/0051498 A1 * | 3/2006 | Katagami et al. | ............... | 427/66 |
| 2006/0098316 A1 * | 5/2006 | Tatsuzawa et al. | ............. | 359/891 |
| 2008/0084376 A1 * | 4/2008 | Hirota et al. | .................... | 345/88 |
| 2009/0091546 A1 * | 4/2009 | Joo et al. | ......................... | 345/173 |
| 2009/0268132 A1 * | 10/2009 | Takama et al. | ................. | 349/106 |
| 2010/0214262 A1 * | 8/2010 | Ishizaki et al. | ................. | 345/174 |

FOREIGN PATENT DOCUMENTS

| | | |
|---|---|---|
| JP | 61-230101 | 10/1986 |
| JP | 07-036027 | 2/1995 |
| JP | 08-234019 | 9/1996 |
| JP | 3485997 | 10/2003 |

* cited by examiner

*Primary Examiner* — Joe H Cheng
(74) *Attorney, Agent, or Firm* — Antonelli, Terry, Stout & Kraus, LLP.

(57) ABSTRACT

Provided is a liquid crystal display device, which includes a TFT substrate (230) including: first pixel electrodes (237) which are pixel electrodes at regions corresponding to first filter regions; second pixel electrodes (238) which are pixel electrodes at regions corresponding to second filter regions. The liquid crystal display device has a brightness priority mode, which puts priority on bright screen display, and a response speed priority mode, which puts priority on response of a liquid crystal composition at a time of rewriting of a screen. In the response speed priority mode, a voltage to be applied to the second pixel electrode (238) differs from that in the brightness priority mode. With this, it is possible to realize high transmittance and low power consumption while responding to display of images requiring high response speed.

9 Claims, 8 Drawing Sheets

| | BRIGHTNESS PRIORITY MODE | RESPONSE SPEED PRIORITY MODE |
|---|---|---|
| FIRST PIXEL ELECTRODE 237 | WRITING WITH 256-GRADATION VOLTAGE | WRITING WITH 256-GRADATION VOLTAGE |
| SECOND PIXEL ELECTRODE 238 | | 0-GRADATION (BLACK) WRITING |

FIG.7

| | BRIGHTNESS PRIORITY MODE | RESPONSE SPEED PRIORITY MODE |
|---|---|---|
| FIRST PIXEL ELECTRODE 237 | WRITING WITH 256-GRADATION VOLTAGE | WRITING WITH 256-GRADATION VOLTAGE |
| SECOND PIXEL ELECTRODE 238 | | WRITING WITH 256-GRADATION VOLTAGE BEING APPLIED TO THE VOLTAGE RANGE OF 10 TO 245 GRADATIONS OF 0 TO 256 GRADATIONS USED IN GENERAL |

FIG.8

| | BRIGHTNESS PRIORITY MODE | RESPONSE SPEED PRIORITY MODE |
|---|---|---|
| FIRST PIXEL ELECTRODE 237 | TWO-TIME CONSECUTIVE WRITING WITH GRADATION VOLTAGE | TWO-TIME CONSECUTIVE WRITING WITH GRADATION VOLTAGE |
| SECOND PIXEL ELECTRODE 238 | | 0-GRADATION (BLACK) WRITING, AND WRITING WITH GRADATION VOLTAGE |

LIQUID CRYSTAL DISPLAY DEVICE

CROSS-REFERENCE TO RELATED APPLICATION

The present application claims priority from Japanese application JP 2010-145426 filed on Jun. 25, 2010, the content of which is hereby incorporated by reference into this application.

BACKGROUND OF THE INVENTION

1. Field of the Invention

The present invention relates to a liquid crystal display device.

2. Description of the Related Art

A liquid crystal display device is widely used as a display device for an information communication terminal, such as a computer, and a television set. The liquid crystal display device is a device in which an image is displayed by changing an electric field in a liquid crystal layer to change alignment of a liquid crystal composition, thereby controlling the transmittance through a liquid crystal display panel of light emitted from a backlight unit. In recent years, considering request for electric power saving, also the liquid crystal display device is required to have a liquid crystal display panel with high transmittance in order to suppress power consumption of the backlight unit.

Japanese Patent Application Laid-open No. Sho 61-230101 discloses a color filter comprising a transparent or semi-transparent portion in a color filter, because a color filter employing a dyeing method is deteriorated due to light irradiation. Japanese Patent Application Laid-open No. Hei 07-36027 discloses a liquid crystal display device, in which the thickness of the liquid crystal layer is changed according to each color in the color filter. Japanese Patent No. 3485997 discloses a liquid crystal display device, in which an opening portion is provided in a filter so as to improve the transmittance.

SUMMARY OF THE INVENTION

In these days, a liquid crystal display device capable of displaying 3-D graphics has appeared, and hence the liquid crystal display device is required to be driven at higher speed. On the other hand, as described above, there is a request for electric power saving. In order to perform high speed driving, it is necessary to reduce the thickness of the liquid crystal layer (hereinafter, referred to as "cell gap") and increase the responsiveness of the liquid crystal. However, it is known that the reduction in cell gap causes the reduction in transmittance. Further, even though the transmittance is increased by providing an opening portion in the color filter or the like as described in Japanese Patent No. 3485997, the cell gap at the opening portion is increased, and hence the responsiveness is decreased.

The present invention has been made in view of the above-mentioned circumstances, and therefore has an object to provide a liquid crystal display device which is capable of displaying of images requiring high response speed and also has high transmittance and low power consumption.

A liquid crystal display device according to the present invention includes: a first filter region in which a color resist film is formed; a second filter region including a high transmittance region in which light transmittance is higher than the first filter region; a first pixel electrode for controlling, by a voltage to be applied, an amount of transmittance of light that passes through the first filter region; a second pixel electrode for controlling, by a voltage to be applied, an amount of transmittance of light that passes through the second filter region; a first pixel transistor for controlling gradation voltage application to the first pixel electrode; and a second pixel transistor for controlling gradation voltage application to the second pixel electrode, in which the gradation voltage application to the first pixel electrode and the gradation voltage application to the second pixel electrode are separately controlled by the first pixel transistor and the second pixel transistor, respectively.

Further, in the liquid crystal display device according to the present invention: each of the first pixel transistor and the second pixel transistor may be controlled in a brightness priority mode, which puts priority on bright screen display, and a response speed priority mode, which puts priority on response of a liquid crystal composition at a time of rewriting of a screen; and the voltage to be applied to the second pixel electrode may be controlled differently between the response speed priority mode and the brightness priority mode.

Further, in the liquid crystal display device according to the present invention, in the response speed priority mode, the second pixel electrode may always be applied with a gradation voltage for black display.

Further, in the liquid crystal display device according to the present invention, in the response speed priority mode, the second pixel electrode may be set to have a voltage range which is narrower than a voltage range set in the brightness priority mode.

Further, in the liquid crystal display device according to the present invention: the first pixel transistor and the second pixel transistor may each have a gate applied with a gate signal having a high frequency; in the brightness priority mode, the same gradation voltage may be consecutively applied two times to the second pixel electrode; and in the response speed priority mode, a gradation voltage for black display and a gradation voltage for image display may be applied in the stated order to the second pixel electrode. Here, the "high frequency" specifically means a frequency of 120 Hz or higher, for example, 120 Hz, which is two times 60 Hz, or 240 Hz, which is four times 60 Hz.

Further, in the liquid crystal display device according to the present invention, in the high transmittance region, the same color resist film as the color resist film formed in the first filter region may be formed thinner than the color resist film of the first filter region.

Further, in the liquid crystal display device according to the present invention, in the second filter region, the same color resist film as the color resist film formed in the first filter region may be formed to surround, in a visual field projected on a plane parallel to a display surface, the high transmittance region and have the same thickness as the color resist film formed in the first filter region.

Further, in the liquid crystal display device according to the present invention, the second filter region may be disposed adjacent to the first filter region through intermediation of a black matrix.

Further, in the liquid crystal display device according to the present invention: a number of the second filter regions may be the same as a number of the first filter regions; and all of the first filter regions may have the corresponding second filter regions, respectively.

DETAILED DESCRIPTION OF THE INVENTION

Hereinafter, embodiments of the present invention are described with reference to the drawings. Note that, in the drawings, the same or similar components are denoted by the same reference symbols, and overlapping description thereof is omitted.

[First Embodiment]

Figure 1:
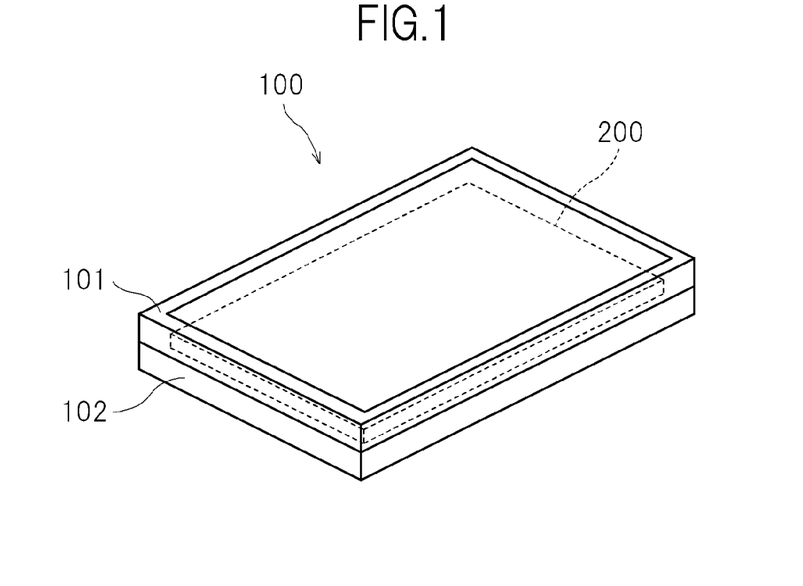
FIG. 1 is a view illustrating a liquid crystal display device according to a first embodiment of the present invention.

FIG. 1 is a view illustrating a liquid crystal display device 100 according to a first embodiment of the present invention. As illustrated in FIG. 1, the liquid crystal display device 100 includes a liquid crystal display panel 200, an upper frame 101 and a lower frame 102, which fix the liquid crystal display panel 200 in a manner sandwiching the liquid crystal display panel 200, and a circuit board (not shown) including a circuit element for generating information to be displayed.

Figure 2:
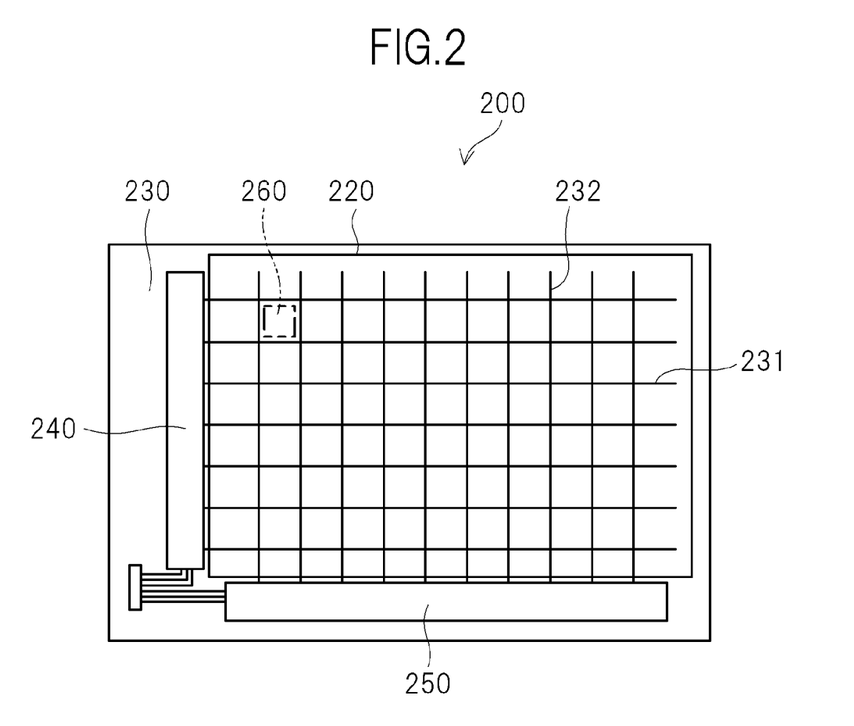
FIG. 2 is a view illustrating a structure of a liquid crystal display panel of FIG. 1.

FIG. 2 illustrates the structure of the liquid crystal display panel 200 of FIG. 1. The liquid crystal display panel 200 includes two substrates, that is, a thin film transistor substrate (hereinafter, simply referred to as "TFT substrate") 230 and a color filter substrate 220. A liquid crystal composition is sealed between the two substrates. Scanning signal lines 231, which are controlled by a scanning signal drive circuit 240, and data signal lines 232, which are controlled by a data signal drive circuit 250, are crisscrossed the TFT substrate 230. Those signal lines form pixels 260 of the liquid crystal display device 100. Note that, the scanning signal drive circuit 240 and the data signal drive circuit 250 are each formed as a plurality of IC chips on a flexible substrate, and are adhered onto the TFT substrate 230. The data signal drive circuit 250 is adhered only on one side of the TFT substrate 230 in some cases, and adhered on both two sides of the TFT substrate 230 in other cases. Further, the liquid crystal display panel 200 has the number of pixels 260 corresponding to the display resolution, but the illustration is simplified in FIG. 2 so as to avoid getting complex.

Figure 3A:
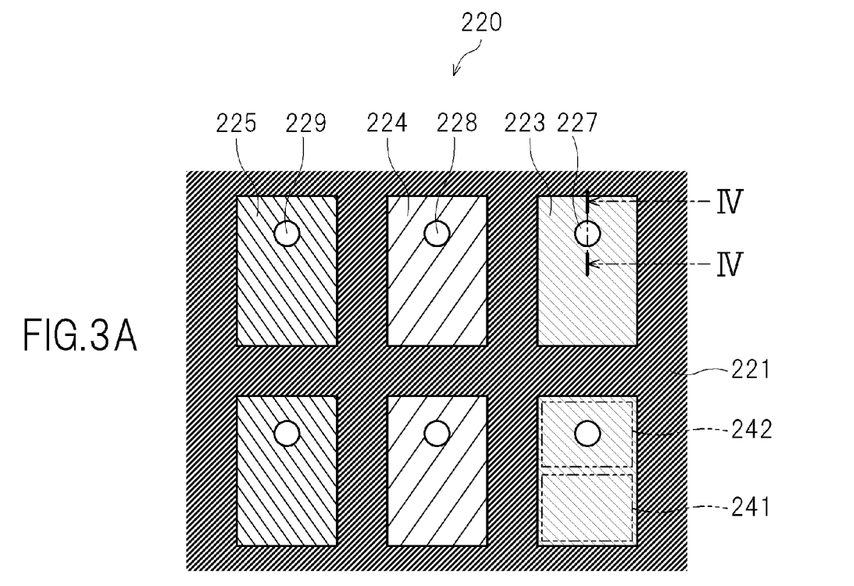
FIG. 3A is a partial enlarged view illustrating a state of filter arrangement of a color filter substrate of FIG. 2.

FIG. 3A is a partial enlarged view illustrating a state of filter arrangement of the color filter substrate 220. As illustrated in FIG. 3A, the color filter substrate 220 includes a black matrix 221 for blocking light which leaks from a gap between filter areas in which color resist films are formed, blue filter areas 223 in which blue color resist films are formed, green filter areas 224 in which green color resist films are formed, red filter areas 225 in which red color resist films are formed, and low resist regions 227 to 229 in which the color resist films are formed thinly to increase light transmittance in the respective filter areas 223 to 225. Here, as illustrated by chain double-dashed lines in FIG. 3A, in each of the regions including the low resist regions 227 to 229 and in which the resist films are formed, a region which does not include the low resist region and in which a uniform resist film is formed is defined as a first filter region 241, and a region which includes the low resist region is defined as a second filter region 242.

Figure 3B:
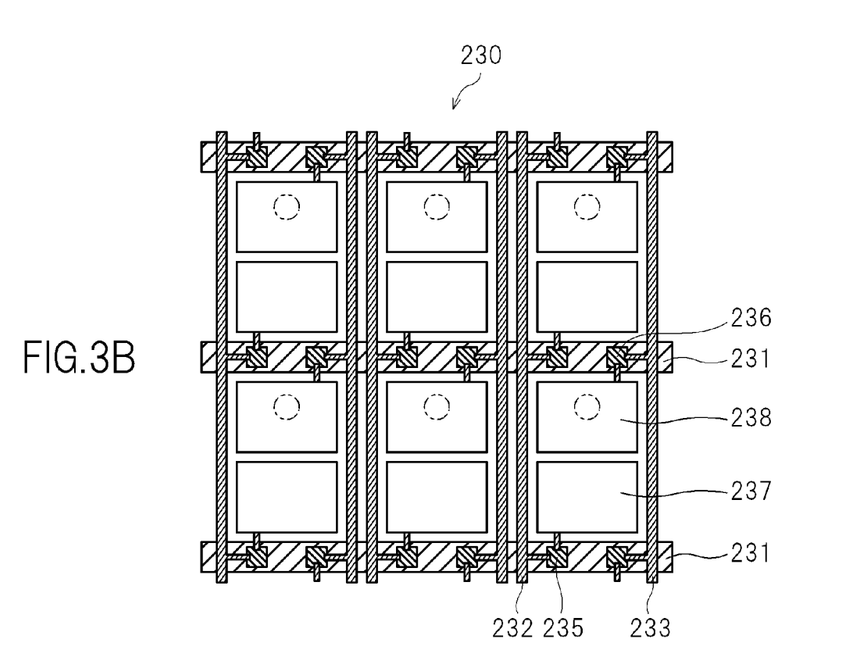
FIG. 3B is a view illustrating a wiring state of a TFT substrate from the same view as FIG. 3A.

FIG. 3B illustrates a wiring state of the TFT substrate 230 from the same view as FIG. 3A. As illustrated in FIG. 3B, the TFT substrate 230 includes first pixel electrodes 237 which are pixel electrodes at regions corresponding to the first filter regions 241, second pixel electrodes 238 which are pixel electrodes at regions corresponding to the second filter regions 242, data signal lines 232 for supplying a gradation voltage to the first pixel electrodes 237, data signal lines 233 for supplying a gradation voltage to the second pixel electrodes 238, first pixel transistors 235 which are switches for electrically connecting the data signal lines 232 and the first pixel electrodes 237, second pixel transistors 236 which are switches for electrically connecting the data signal lines 233 and the second pixel electrodes 238, and scanning signal lines 231 connected to gates of the respective pixel transistors.

Figure 4:
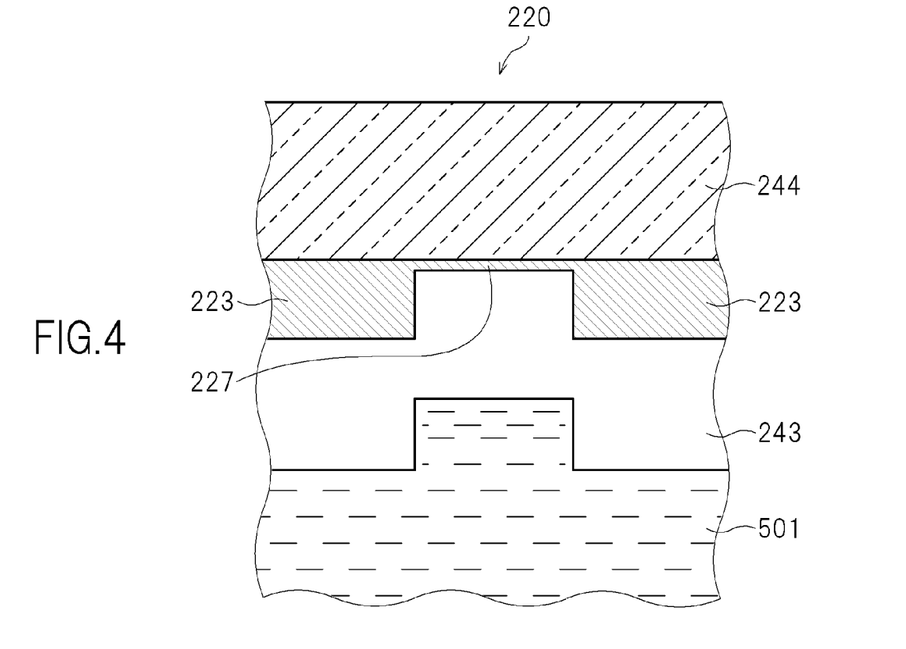
FIG. 4 is a view schematically illustrating a part of a cross section of the liquid crystal display panel cut along the line IV-IV of FIG. 3A.

FIG. 4 is a view schematically illustrating a part of a cross section taken along the line IV-IV of FIG. 3A. As illustrated in FIG. 4, the low resist region 227 is formed on a glass substrate 244 and surrounded by the blue filter area 223. The low resist region 227 and the blue filter area 223 are covered with an overcoat layer 243, but the overcoat layer 243 is recessed in a portion corresponding to the low resist region 227, and hence a liquid crystal layer 501 is formed thicker at this portion compared with other portions. Note that, an alignment film is omitted in FIG. 4.

Figure 5:
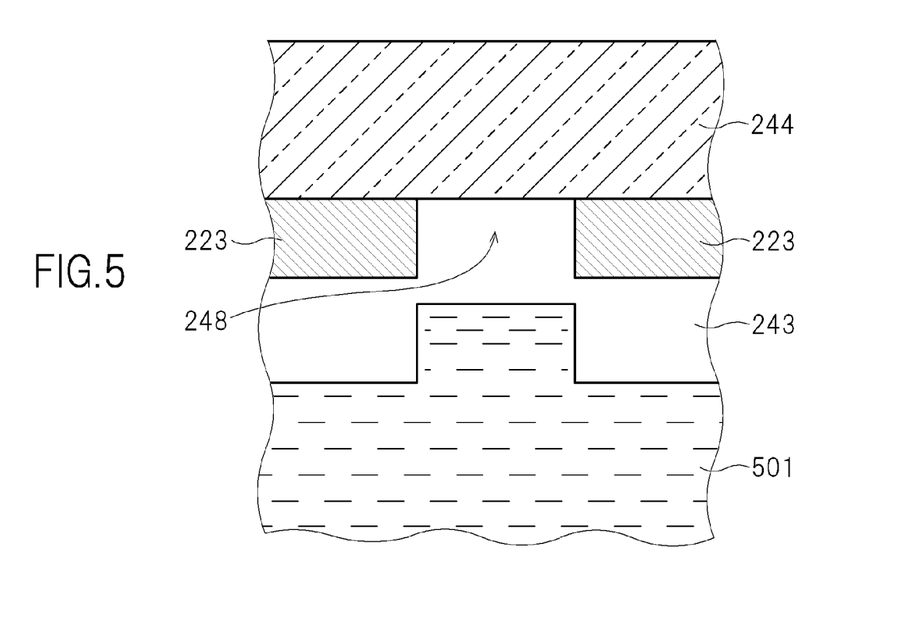
FIG. 5 is a view illustrating a modified example of a low resist region of FIG. 4.

FIG. 5 illustrates a modified example of the low resist region 227 of FIG. 4. A low resist region 248 of FIG. 5 is a region in which a color resist film is not formed. Also in this case, display control as described later is applicable, similarly to the case of FIG. 4.

Next, an example of display control using the first pixel electrode 237 and the second pixel electrode 238 is described. In this embodiment, the liquid crystal display device 100 has two kinds of modes, that is, a brightness priority mode for displaying bright screen with low power consumption, and a response speed priority mode for displaying video images more clearly.

Figure 6:
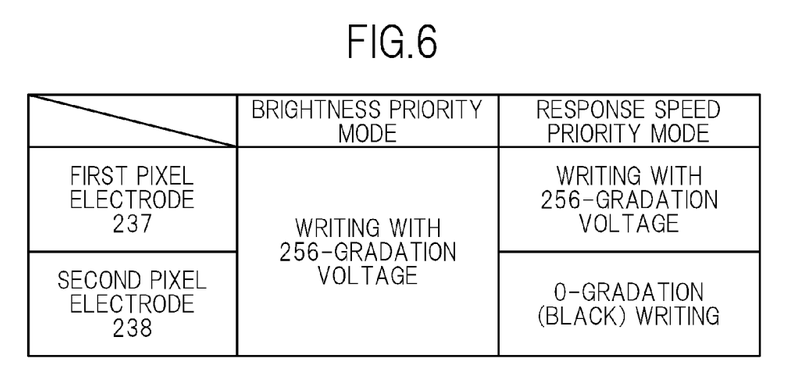
FIG. 6 is a table showing an example of first display control.

FIG. 6 shows an example of first display control. In the example of the first display control, in the brightness priority mode, general 256-gradation writing is performed to both of the first pixel electrode 237 and the second pixel electrode 238. On the other hand, in the response speed priority mode, general 256-gradation writing is performed to the first pixel electrode 237 similarly to the brightness priority mode, but 0-gradation writing, that is, writing for black display is always performed to the second pixel electrode 238. With this, in the case of the response speed priority mode in which the response speed for 3-D image display or the like is required, the second filter region 242 having slow response speed is not used, and hence video images may be displayed clearly.

Figure 7:
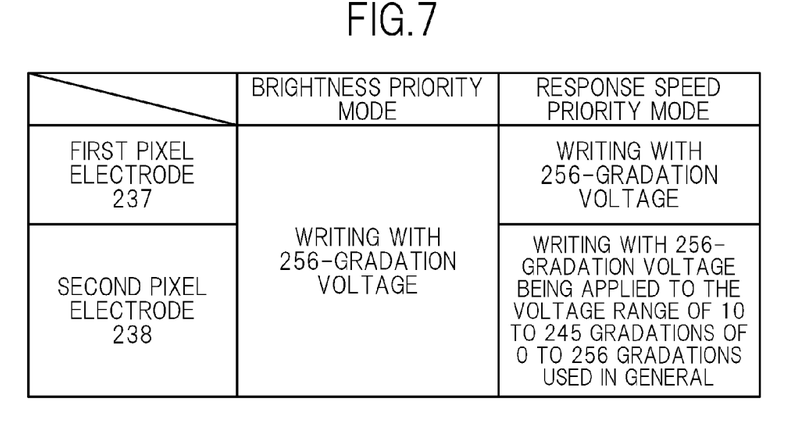
FIG. 7 is a table showing an example of second display control.

FIG. 7 shows an example of second display control. In the example of the second display control, similarly to the example of the first display control, in the brightness priority mode, general 256-gradation writing is performed to both of the first pixel electrode 237 and the second pixel electrode 238. On the other hand, in the response speed priority mode, gradation display is performed as follows. That is, to the first pixel electrode 237, general 256-gradation writing is performed similarly to the brightness priority mode. However, the gradation voltage, which is used for the second pixel electrode 238, is the 256 gradations voltage being applied to the compressed voltage range of 10 to 245 gradations of 0 to 255 gradations used in general. With this, even in the second filter region 242 having slow response speed, overdrive can be adopted in which a larger voltage exceeding the compressed voltage range is applied to the second pixel electrode 238. Therefore, it is possible to obtain faster response in the second filter region 242.

Figure 8:
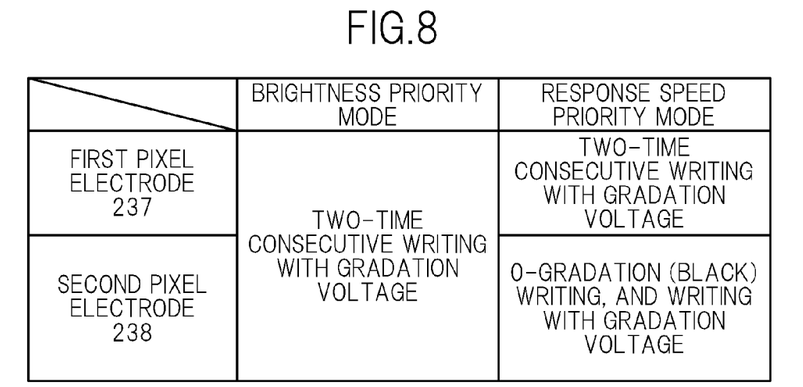
FIG. 8 is a table showing an example of third display control.

FIG. 8 shows an example of third display control. The example of the third display control uses a drive frequency which is two times (for example, 120 Hz) the general frequency or higher. In the brightness priority mode, to both of the first pixel electrode 237 and the second pixel electrode 238, two-time consecutive writing with 256-gradation voltage is performed by two gate signals. On the other hand, in the response speed priority mode, to the first pixel electrode 237, two-time consecutive writing with 256-gradation voltage is performed similarly to the brightness priority mode, but to the second pixel electrode 238, 0-gradation writing, that is, black writing is performed by the first gate signal, and then writing with gradation voltage is performed by the second gate signal. With this, in the second filter region 242 having slow response speed, image retention time due to hold driving is shortened by the black writing, and hence video images may be displayed more clearly.

Therefore, according to the liquid crystal display device of the first embodiment, because the first filter region having general light transmittance and the second filter region having higher transmittance are provided, it is possible to maintain high transmittance while suppressing the power consumption low.

Further, the control of the voltage to be applied to the first pixel electrode corresponding to the first filter region and the control of the voltage to be applied to the second pixel electrode corresponding to the second filter region are changed depending on the image type to be displayed. Therefore, it is possible to display a 3-D image or clear video images in which high response speed is required.

[Second Embodiment]

Figure 9A:
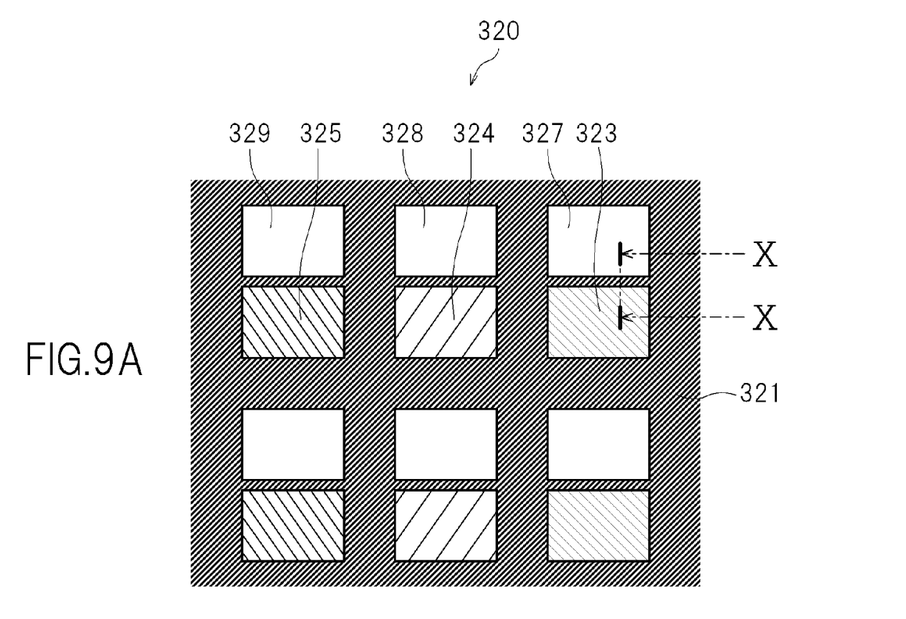
FIG. 9A is a partial enlarged view illustrating a state of filter arrangement of a color filter substrate according to a second embodiment of the present invention.

FIG. 9A is a partial enlarged view illustrating a state of filter arrangement of a color filter substrate 320 according to a second embodiment of the present invention. Note that, structures of a liquid crystal display device and a liquid crystal display panel of this embodiment are the same as those of the first embodiment illustrated in FIGS. 1 and 2, and hence description thereof is omitted. As illustrated in FIG. 9A, the color filter substrate 320 includes a black matrix 321 for blocking light which leaks from a gap between filter areas in which color resist films are formed, blue filter areas 323 in which blue color resist films are formed, green filter areas 324 in which green color resist films are formed, red filter areas 325 in which red color resist films are formed, and in order to increase light transmittance, low resist regions 327 in which the blue color resist films are formed thinly, low resist regions 328 in which the green color resist films are formed thinly, and low resist regions 329 in which the red color resist films are formed thinly. Here, as illustrated in FIG. 9A, the filter areas 323 to 325 of the respective colors and the low resist regions 327 to 329 are formed in rectangular shapes having substantially the same size. Further, in this embodiment, the portions corresponding to the first filter regions are the filter areas 323 to 325, and the portions corresponding to the second filter regions are the low resist regions 327 to 329.

Figure 9B:
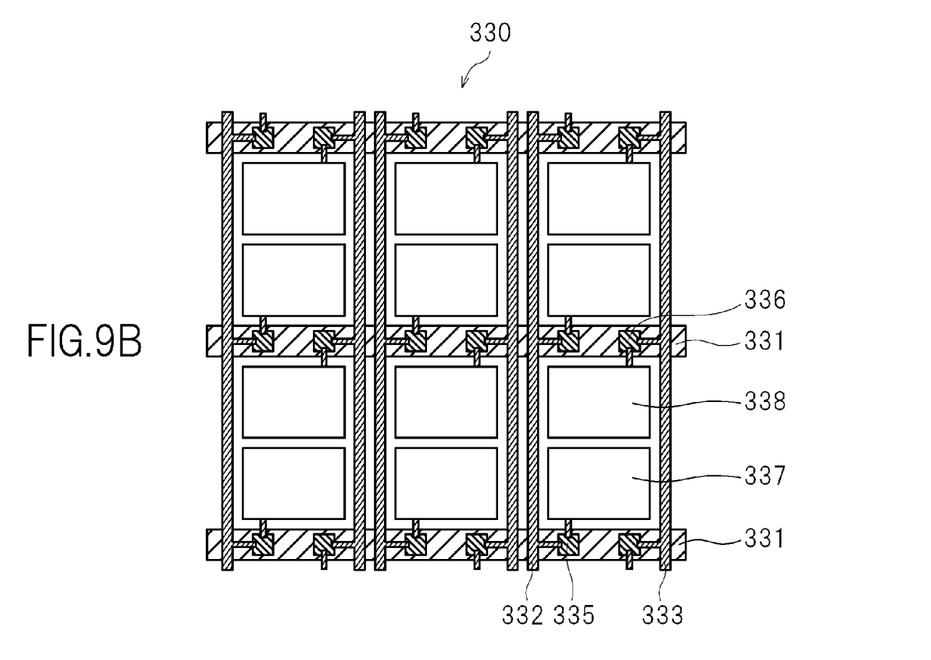
FIG. 9B is a view illustrating a wiring state of a TFT substrate from the same view as FIG. 9A.

FIG. 9B illustrates a wiring state of a TFT substrate 330 from the same view as FIG. 9A. As illustrated in FIG. 9B, the TFT substrate 330 includes first pixel electrodes 337 which are pixel electrodes at regions corresponding to the first filter regions, second pixel electrodes 338 which are pixel electrodes at regions corresponding to the second filter regions, data signal lines 332 for supplying a gradation voltage to the first pixel electrodes 337, data signal lines 333 for supplying a gradation voltage to the second pixel electrodes 338, first pixel transistors 335 which are switches for electrically connecting the data signal lines 332 and the first pixel electrodes 337, second pixel transistors 336 which are switches for electrically connecting the data signal lines 333 and the second pixel electrodes 338, and scanning signal lines 331 connected to gates of the respective pixel transistors.

Figure 10:
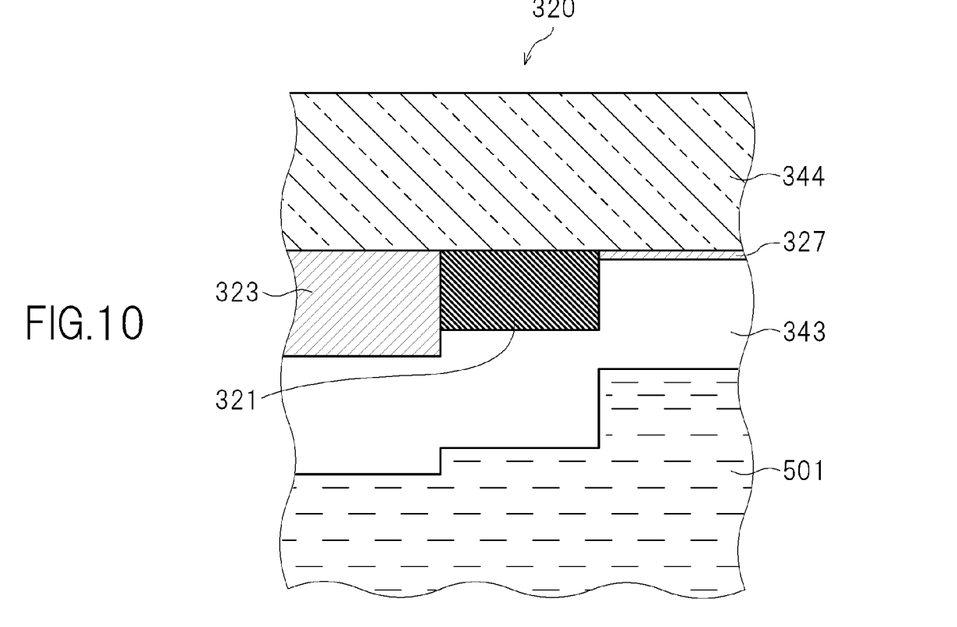
FIG. 10 is a view schematically illustrating a part of a cross section of a liquid crystal display panel cut along the line X-X of FIG. 9A.

FIG. 10 schematically illustrates a part of a cross section of the liquid crystal display panel cut along the line X-X of FIG. 9A. As illustrated in FIG. 10, the low resist region 327 and the blue filter area 323 are formed on a glass substrate 344 while sandwiching the black matrix 321 therebetween. The low resist region 327, the black matrix 321, and the blue filter area 323 are covered with an overcoat layer 343, but the overcoat layer 343 is recessed in a portion corresponding to the low resist region 327, and hence a liquid crystal layer 501 is formed thicker at this portion compared with other portions. Note that, an alignment film is omitted in FIG. 10.

Figure 11:
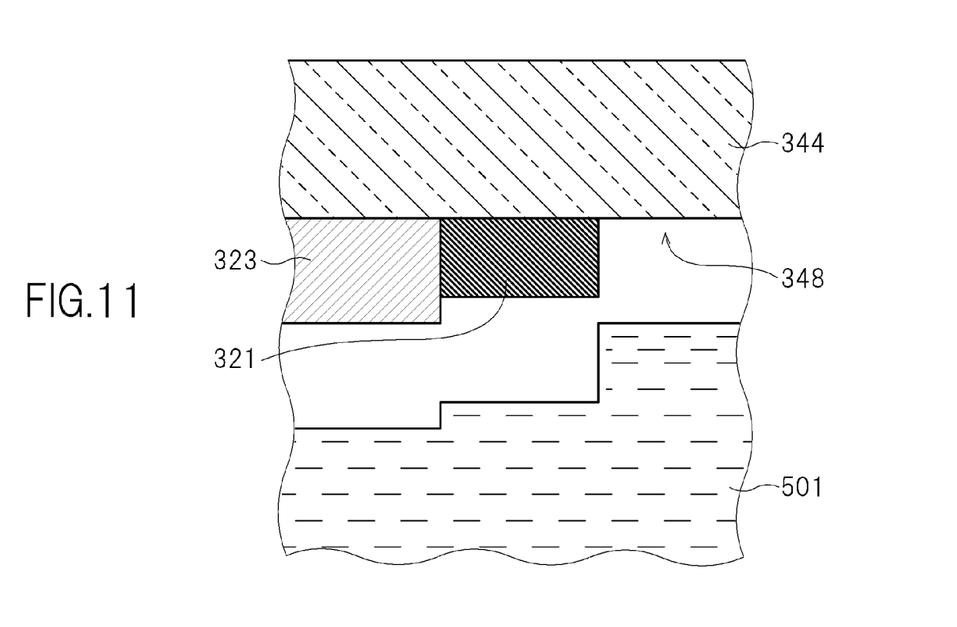
FIG. 11 is a view illustrating a modified example of a low resist region of FIG. 10.

FIG. 11 illustrates a modified example of the low resist region 327 of FIG. 10. A low resist region 348 of FIG. 11 is a region in which a color resist film is not formed.

The TFT substrate 330 illustrated in FIG. 9B and the TFT substrate 230 illustrated in FIG. 3B have the same structure. Further, as for the display control, similarly to the first embodiment, the examples of the first to third display control shown in FIG. 6 to FIG. 8 may be applied to this embodiment.

Therefore, according to the liquid crystal display device of the second embodiment, similarly to the first embodiment, because the first filter region having general light transmittance and the second filter region having higher transmittance are provided, it is possible to maintain high transmittance while suppressing the power consumption low.

Further, the control of the voltage to be applied to the first pixel electrode corresponding to the first filter region and the control of the voltage to be applied to the second pixel electrode corresponding to the second filter region are changed depending on the image type to be displayed. Therefore, it is possible to display a 3-D image or clear video images in which high response speed is required.

Figure 12:
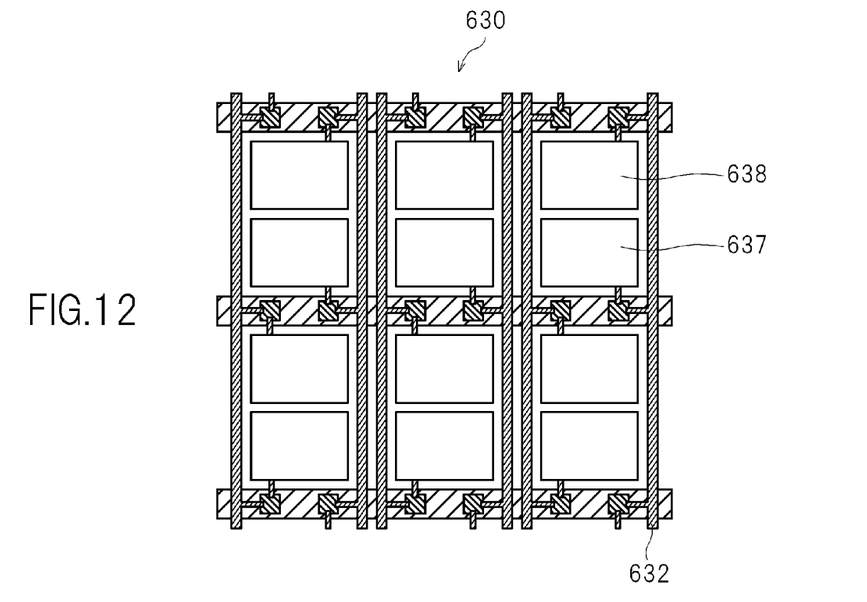
FIG. 12 is a view illustrating another example of the wiring of the TFT substrate.

Note that, in the TFT substrate 330 illustrated in FIG. 9B and the TFT substrate 230 illustrated in FIG. 3B, the data signal line 332 or 232 is connected to the first pixel electrode 337 or 237, and the data signal line 333 or 233 is connected to the second pixel electrode 338 or 238. However, as illustrated in a TFT substrate 630 of FIG. 12, even if the TFT substrate 630 is structured so that a first pixel electrode 637 and a second pixel electrode 638 are both connected to one data signal line 632, the examples of the first to third display control described above may be applied.

[Third Embodiment]

Figure 13A:
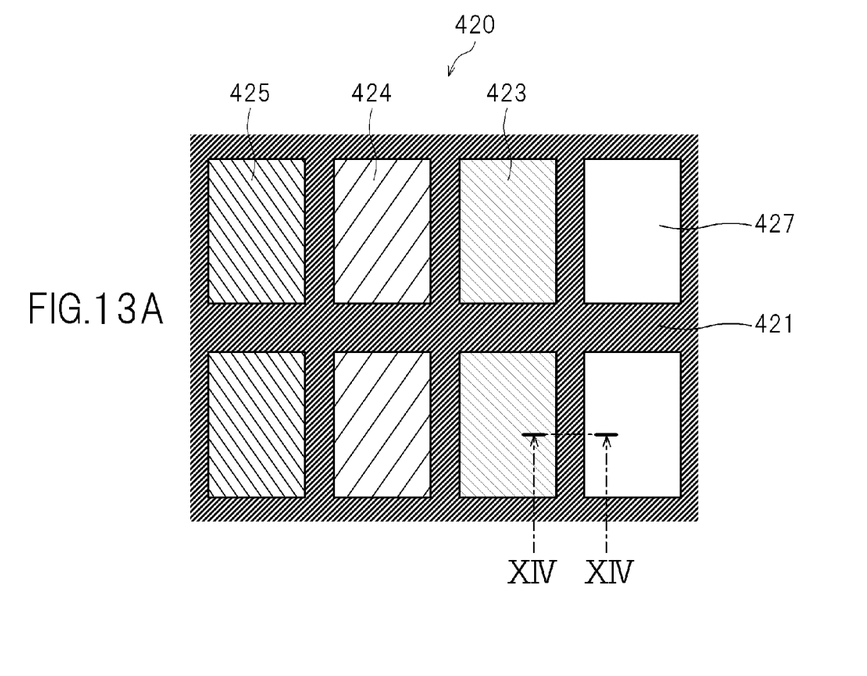
FIG. 13A is a partial enlarged view illustrating a state of filter arrangement of a color filter substrate according to a third embodiment of the present invention.

FIG. 13A is a partial enlarged view illustrating a state of filter arrangement of a color filter substrate 420 according to a third embodiment of the present invention. Note that, structures of a liquid crystal display device and a liquid crystal display panel of this embodiment are the same as those of the first embodiment illustrated in FIGS. 1 and 2, and hence description thereof is omitted. As illustrated in FIG. 13A, the color filter substrate 420 includes a black matrix 421 for blocking light which leaks from a gap between filter areas in which color resist films are formed, blue filter areas 423 in which blue color resist films are formed, green filter areas 424 in which green color resist films are formed, red filter areas 425 in which red color resist films are formed, and resist free regions 427 in which color resist films are not formed to increase light transmittance. Here, as illustrated in FIG. 13A, the filter areas 423 to 425 of the respective colors and the resist free regions 427 are formed in rectangular shapes having substantially the same size. Further, in this embodiment, the portions corresponding to the first filter regions are the filter areas 423 to 425, and the portions corresponding to the second filter regions are the resist free regions 427.

Figure 13B:
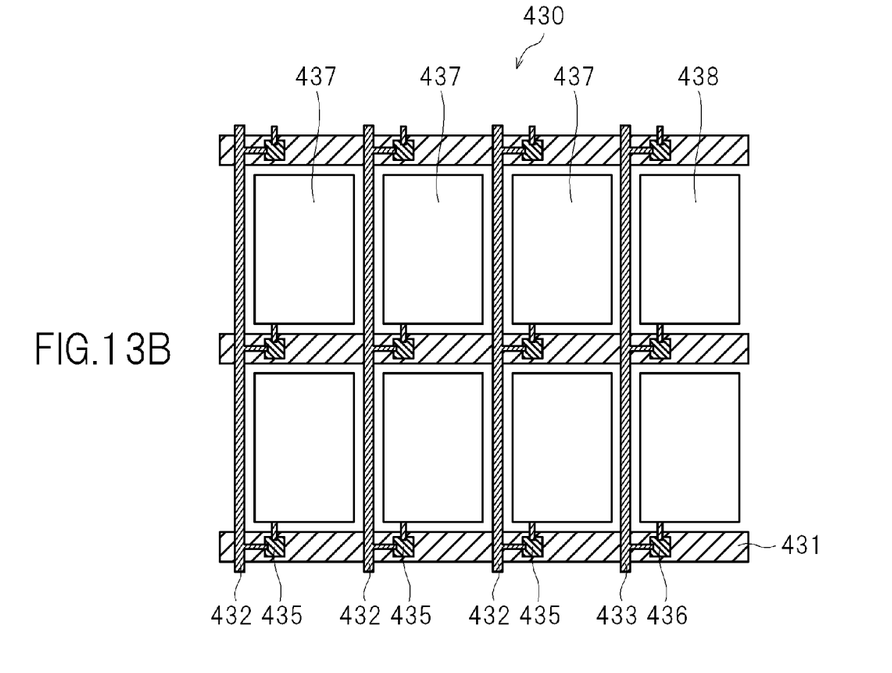
FIG. 13B is a view illustrating a wiring state of a TFT substrate from the same view as FIG. 13A.

FIG. 13B illustrates a wiring state of a TFT substrate 430 from the same view as FIG. 13A. As illustrated in FIG. 13B, the TFT substrate 430 includes first pixel electrodes 437 which are pixel electrodes at regions corresponding to the first filter regions, second pixel electrodes 438 which are pixel electrodes at regions corresponding to the second filter regions, data signal lines 432 for supplying a gradation voltage to the first pixel electrodes 437, a data signal line 433 for supplying a gradation voltage to the second pixel electrodes 438, first pixel transistors 435 which are switches for electrically connecting the data signal lines 432 and the first pixel electrodes 437, second pixel transistors 436 which are switches for electrically connecting the data signal line 433 and the second pixel electrodes 438, and scanning signal lines 431 connected to gates of the respective pixel transistors.

Figure 14:
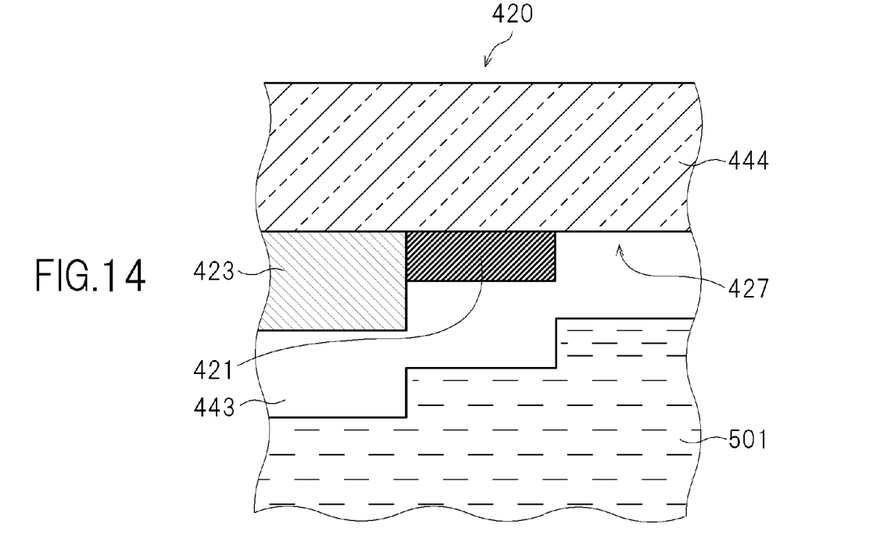
FIG. 14 is a view schematically illustrating a part of a cross section of a liquid crystal display panel cut along the line XIV-XIV of FIG. 13A.

FIG. 14 schematically illustrates a part of a cross section of the liquid crystal display panel cut along the line XIV-XIV of FIG. 13A. As illustrated in FIG. 10, the resist free region 427 and the blue filter area 423 in the color filter substrate 420 are formed on a glass substrate 444 while sandwiching the black matrix 421 therebetween. The resist free region 427, the black matrix 421, and the blue filter area 423 are covered with an overcoat layer 443, but the overcoat layer 443 is recessed in a portion corresponding to the resist free region 427, and hence a liquid crystal layer 501 is formed thicker at this portion compared with other portions. Note that, an alignment film is omitted in FIG. 14.

Even in the case of the TFT substrate 430 illustrated in FIG. 13B, the first pixel electrode 437 and the second pixel electrode 438 are controlled similarly to the case of the first embodiment, and hence the examples of the first to third display control shown in FIG. 6 to FIG. 8 may be applied to this embodiment.

Therefore, according to the liquid crystal display device of the third embodiment, similarly to the first embodiment, because the first filter region having general light transmittance and the second filter region having higher transmittance are provided, it is possible to maintain high transmittance while suppressing the power consumption low.

Further, the control of the voltage to be applied to the first pixel electrode corresponding to the first filter region and the control of the voltage to be applied to the second pixel electrode corresponding to the second filter region are changed depending on the image type to be displayed. Therefore, it is possible to display a 3-D image or clear video images in which high response speed is required.

Note that, the first pixel transistors 435 and the second pixel transistors 436 illustrated in FIG. 13B are respectively connected to the pixel electrodes on the right side with respect to all of the data signal lines 432 and 433 in FIG. 13B. However, even if the TFT substrate is structured so that the first pixel transistors 435 and the second pixel transistors 436 are alternately connected in each row to the pixel electrodes on the right side and the left side of the data signal lines 432 and 433, the examples of the first to third display control described above may be applied.

Note that, in the embodiments described above, description is made using a 256-gradation RGB color filter as an example, but the present invention is applicable also to a case where a color filter of other colors in other number of gradations is used.

Further, the mode of the liquid crystal display device is not particularly designated in the embodiments described above, but the present invention is applicable to a so-called in-plane switching (IPS) mode, vertically aligned (VA) mode, or twisted nematic (TN) mode liquid crystal display device or liquid crystal display devices in other modes.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a first filter region in which a color resist film is formed;
   a second filter region including a high transmittance region in which light transmittance is higher than the first filter region;
   a first pixel electrode for controlling, by a voltage to be applied, an amount of transmittance of light that passes through the first filter region;
   a second pixel electrode for controlling, by a voltage to be applied, an amount of transmittance of light that passes through the second filter region;
   a first pixel transistor for controlling gradation voltage application to the first pixel electrode; and
   a second pixel transistor for controlling gradation voltage application to the second pixel electrode,
   wherein the gradation voltage application to the first pixel electrode and the gradation voltage application to the second pixel electrode are separately controlled by the first pixel transistor and the second pixel transistor, respectively.

2. The liquid crystal display device according to claim 1, wherein:
   each of the first pixel transistor and the second pixel transistor is controlled in a brightness priority mode, which puts priority on bright screen display, and a response speed priority mode, which puts priority on response of a liquid crystal composition at a time of rewriting of a screen; and the voltage to be applied to the second pixel electrode is controlled differently between the response speed priority mode and the brightness priority mode.

3. The liquid crystal display device according to claim 2, wherein, in the response speed priority mode, the second pixel electrode is always applied with a gradation voltage for black display.

4. The liquid crystal display device according to claim 2, wherein, in the response speed priority mode, the second pixel electrode is set to have a voltage range which is narrower than a voltage range set in the brightness priority mode.

5. The liquid crystal display device according to claim 2, wherein:
the first pixel transistor and the second pixel transistor each have a gate applied with a gate signal having a high frequency;
in the brightness priority mode, the same gradation voltage is consecutively applied two times to the second pixel electrode; and
in the response speed priority mode, a gradation voltage for black display and a gradation voltage for image display are applied in the stated order to the second pixel electrode.

6. The liquid crystal display device according to claim 1, wherein, in the high transmittance region, the same color resist film as the color resist film formed in the first filter region is formed thinner than the color resist film of the first filter region.

7. The liquid crystal display device according to claim 1, wherein, in the second filter region, the same color resist film as the color resist film formed in the first filter region is formed to surround the high transmittance region in a view from the direction perpendicular to a display surface and have the same thickness as the color resist film formed in the first filter region.

8. The liquid crystal display device according to claim 1, wherein the second filter region is disposed adjacent to the first filter region through intermediation of a black matrix.

9. The liquid crystal display device according to claim 1, wherein:
a number of the second filter regions is the same as a number of the first filter regions; and
all of the first filter regions have the corresponding second filter regions, respectively.

* * * * *